(12) United States Patent
Harada et al.

(10) Patent No.: US 6,948,469 B2
(45) Date of Patent: Sep. 27, 2005

(54) LIGHTING APPARATUS FOR ENGINE SWITCH OF VEHICLE

(75) Inventors: Shoichi Harada, Aichi (JP); Shozo Kito, Aichi (JP); Tomoyuki Funayama, Toyota (JP); Toshio Asahi, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/636,896

(22) Filed: Aug. 6, 2003

(65) Prior Publication Data

US 2004/0026606 A1 Feb. 12, 2004

(30) Foreign Application Priority Data

Aug. 6, 2002 (JP) .................................... 2002-229183

(51) Int. Cl.⁷ ............................ F02N 17/00; B60Q 1/26
(52) U.S. Cl. ...................................... 123/179.4; 315/77
(58) Field of Search ............................ 315/77, 78, 80, 315/82; 307/112–115, 139; 340/450.01, 452, 535; 123/179.3, 179.4, 179.5, 179.6

(56) References Cited

U.S. PATENT DOCUMENTS

| | | | | | |
|---|---|---|---|---|---|
| 5,621,277 | A | * | 4/1997 | Ricca | 315/86 |
| 6,396,165 | B1 | * | 5/2002 | Nagano et al. | 307/10.6 |
| 6,434,453 | B1 | * | 8/2002 | Kuroda et al. | 701/22 |
| RE38,338 | E | * | 12/2003 | Yoshida et al. | 307/10.2 |
| 6,699,155 | B2 | * | 3/2004 | Nagasaka | 477/94 |
| 6,722,332 | B2 | * | 4/2004 | Kojima | 123/179.3 |
| 6,741,925 | B2 | * | 5/2004 | Masters et al. | 701/115 |
| 2003/0058086 | A1 | * | 3/2003 | Hara | 340/425.5 |
| 2003/0231131 | A1 | * | 12/2003 | Dimig et al. | 341/176 |

* cited by examiner

*Primary Examiner*—Wilson Lee
*Assistant Examiner*—Minh Dieu A
(74) *Attorney, Agent, or Firm*—Crompton, Seager & Tufte, LLC (57) ABSTRACT

An engine switch for selectively starting and stopping an engine and an LED for irradiating the engine switch are located in a passenger compartment of a vehicle. When a vehicular lighting device, such as a headlight, is switched from an on state to an off state, the LED is lighted up. Therefore, even if the passenger compartment is dark, the position of the engine switch is easily found.

21 Claims, 6 Drawing Sheets

LIGHTING APPARATUS FOR ENGINE SWITCH OF VEHICLE

BACKGROUND OF THE INVENTION

The present invention relates to a lighting apparatus for an engine switch of a vehicle, such as an automobile.

Automobiles are demanded to have improved operational performance as well as improved basic performance and safety. A smart ignition system has been proposed to improve the operational performance. The smart ignition system permits an owner of a vehicle to start or stop an engine only by entering a passenger compartment of the vehicle while holding an electronic key, and manipulating a button switch for the engine located on the vehicle without using a mechanical key.

In the above mentioned smart ignition system, when stopping the engine at night, the button switch for the engine is generally manipulated after turning off a vehicular lighting device, such as a headlight. However, the passenger compartment is dark at night even if the vehicular lighting device is not turned off. Therefore, the position of the button switch for the engine is hard to find. When the vehicular lighting device, such as the headlight, is turned off, instrument lights for lighting up gauges located in the passenger compartment are turned off accordingly. In this state, the passenger compartment becomes even darker and the position of the button switch for the engine is more difficult to find.

SUMMARY OF THE INVENTION

Accordingly, it is an objective of the present invention to permit an owner of a vehicle to easily find the position of an engine switch when a passenger compartment is dark, such as at night.

To achieve the above objective, the present invention provides a lighting apparatus for an engine switch that starts or stops an engine of a vehicle. The lighting apparatus includes an engine switch light and a controller. The engine switch light irradiates the engine switch. The controller controls the engine switch light. When a predetermined light up condition is satisfied, the controller lights up the engine switch light. The light up condition includes at least one of a condition that a lighting device other than the engine switch light located on the vehicle is switched to a predetermined state and a condition that a drive manipulation member, which is manipulated to drive the vehicle, is manipulated to a predetermined state.

The present invention also provides a lighting apparatus for an engine switch that starts or stops an engine of a vehicle. The lighting apparatus includes an engine switch light, a light up manipulation member, and a controller. The engine switch light irradiates the engine switch. The light up manipulation member is manipulated by a person to light up the engine switch light. The controller controls the engine switch light. When a predetermined permitting condition is satisfied, the controller permits the engine switch light to be lighted up in accordance with manipulation of the light up manipulation member. The permitting condition includes at least one of a condition that a lighting device other than the engine switch light located on the vehicle is switched to a predetermined state and a condition that a drive manipulation member, which is manipulated to drive the vehicle, is manipulated to a predetermined state.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A lighting apparatus for a switch for stopping an engine according to a first embodiment of the present invention will now be described with reference to FIGS. 1 to 3. The lighting apparatus is applied to a smart ignition system.

Figure 1:
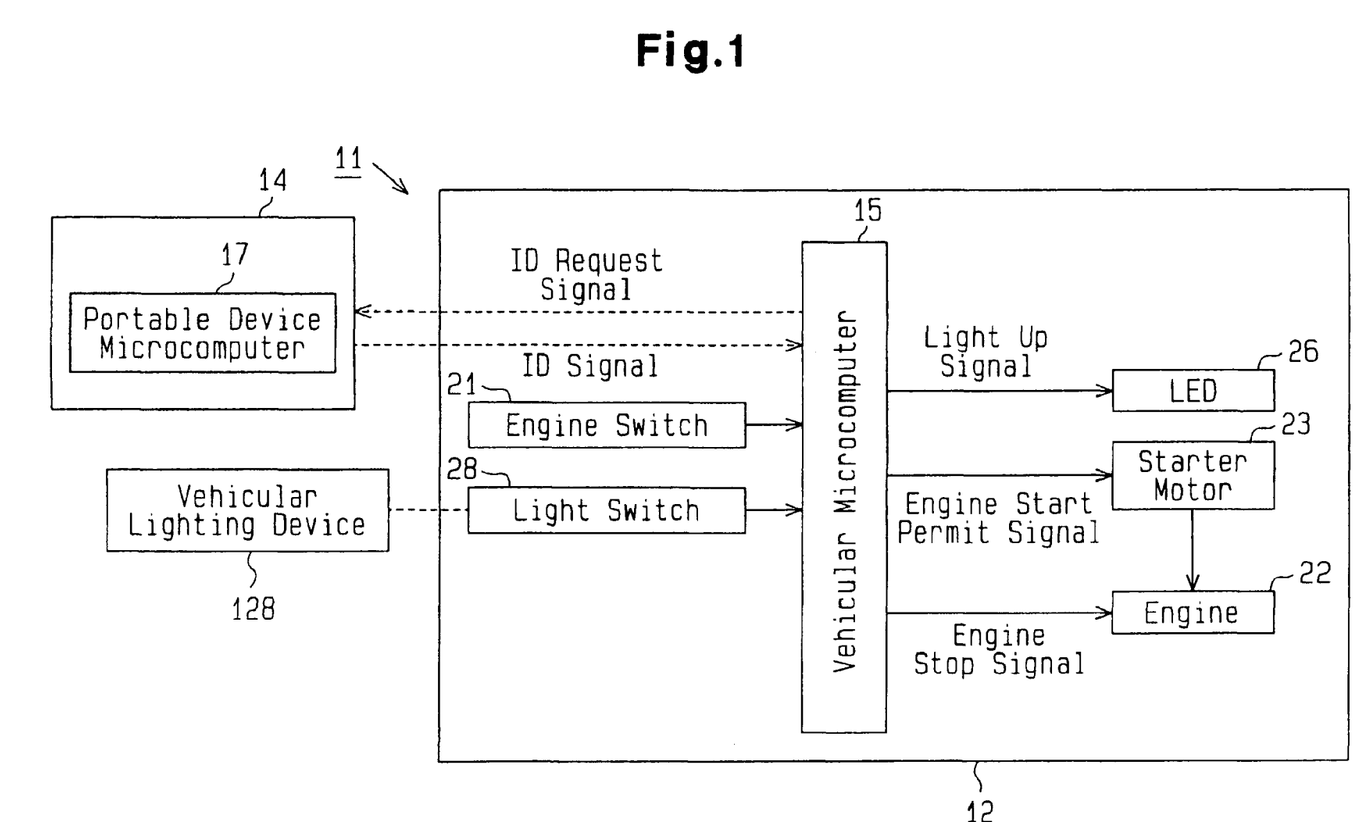
FIG. 1 is a block diagram illustrating a lighting apparatus for an engine switch according to a first embodiment of the present invention.

FIG. 1 is a block diagram showing an electric configuration of a smart ignition system 11. As shown in FIG. 1, the smart ignition system 11 includes a vehicular apparatus 12 mounted to an automobile and a portable communication device 14 held by a user of the automobile.

The vehicular apparatus 12 includes a controller, which is a vehicular microcomputer 15 in the first embodiment. The vehicular microcomputer 15 sends an ID request signal to the portable communication device 14 as a data signal. A memory of the vehicular microcomputer 15 stores an ID code specific to the automobile owned by the user. The vehicular microcomputer 15 determines whether the stored ID code coincides with an ID code included in an ID signal sent from the portable communication device 14 as a data signal.

The portable communication device 14 includes a portable device microcomputer 17. The portable device microcomputer 17 sends the ID signal. The ID signal includes a specific ID code that is used to find the automobile owned by the user from other automobiles. The ID code is stored in a memory of the portable device microcomputer 17. The portable device microcomputer 17 receives the ID request signal sent from the vehicular microcomputer 15, and determines whether the received ID request signal is the ID request signal of the user's automobile. If it is determined that the ID request signal is sent from the automobile owned by the user, the portable device microcomputer 17 sends the ID signal from the portable communication device 14 to the vehicular apparatus 12.

Each of the portable communication device 14 and the vehicular apparatus 12 includes a transmitting circuit and a reception circuit, which are not shown. The transmitting circuit and the reception circuit wirelessly communicate the above mentioned signals. The transmitting circuit converts a signal into a magnetic signal, and sends the magnetic signal to the outside via an antenna connected to the transmitting circuit. The reception circuit receives a signal via an antenna connected to the reception circuit, and demodulates the signal to a pulse signal.

Figure 2:
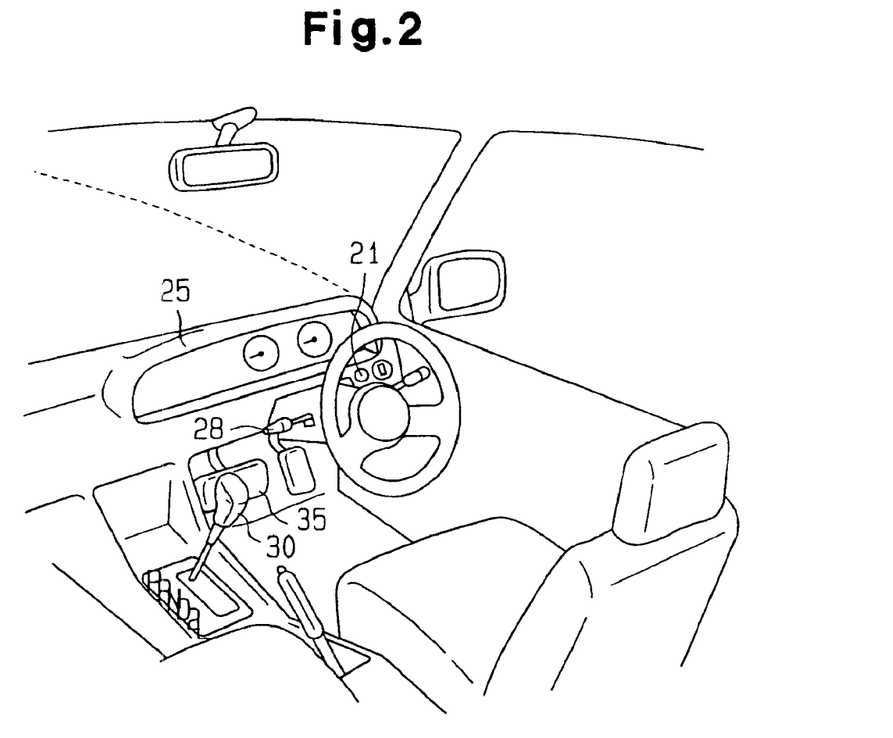
FIG. 2 is a schematic perspective view illustrating the inside of a passenger compartment at which the engine switch is located.

As shown in FIGS. 1 and 2, a push-button engine switch 21 is located in front of a driver's seat on an instrument panel 25, which is located inside a passenger compartment. When the engine switch 21 is manipulated, the vehicular microcomputer 15 sends an engine start permit signal to a starter motor 23 of an engine 22. When the engine switch 21 is manipulated while the engine 22 is running, the vehicular microcomputer 15 sends an engine stop signal to the engine 22.

In the above mentioned smart ignition system 11 that has a lighting apparatus, the portable communication device 14 held by the user in the passenger compartment receives the ID request signal sent from the vehicular apparatus 12. If the portable device microcomputer 17 determines that the received ID request signal is sent from the automobile that the user owns, the portable communication device 14 sends the ID signal to the vehicular apparatus 12. The vehicular microcomputer 15 of the vehicular apparatus 12 determines whether the ID code included in the ID signal coincides with the ID code stored in the vehicular microcomputer 15.

If the engine switch 21 is manipulated when the ID code included in the ID signal coincides with the ID code stored in the vehicular microcomputer 15, the vehicular microcomputer 15 sends an engine start permit signal to the starter motor 23 to start the engine 22. On the contrary, if the engine switch 21 is manipulated when the ID code included in the ID signal does not coincide with the ID code stored in the vehicular microcomputer 15, the vehicular microcomputer 15 invalidates the manipulation of the engine switch 21 on the assumption that the person who manipulated the engine switch 21 is not the user. That is, the engine 22 cannot be started although the engine switch 21 is manipulated. When the engine switch 21 is manipulated while the engine 22 is running, an engine stop signal is sent to the engine 22 to stop the engine 22. In the first embodiment, the engine 22 is selectively started and stopped by one engine switch 21.

The substantial part of the first embodiment will now be described.

Figure 3:
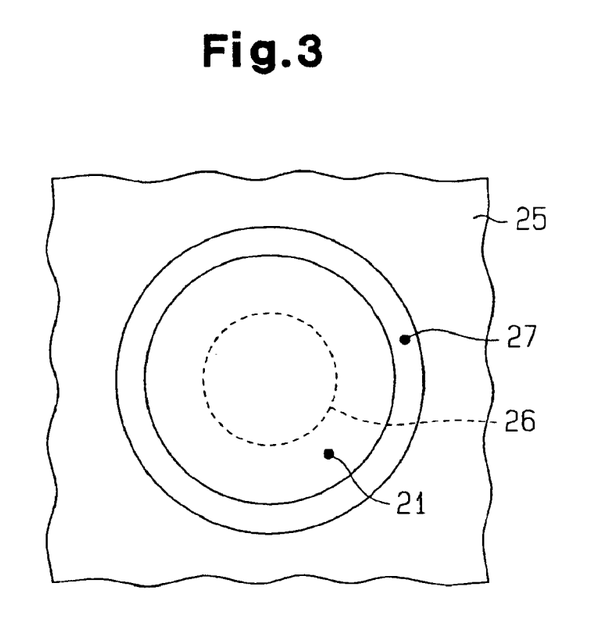
FIG. 3 is an enlarged schematic view illustrating the engine switch.

As shown in FIG. 3, an engine switch light, which is an LED 26 (light emitting diode), is located on the rear side of the instrument panel 25. The LED 26 lights up the engine switch 21. A light-transmitting annular illumination window 27 is formed about a portion of the instrument panel 25 corresponding to the engine switch 21. The light radiated from the LED 26 leaks through the illumination window 27 to the outside and indirectly lights up the engine switch 21.

As shown in FIGS. 1 and 2, a light switch 28 is located inside the passenger compartment. The light switch 28 is manipulated to light on and off a headlight and a vehicular lighting device 128, such as an instrument light, that is illuminated with the headlight. The light switch 28 is electrically connected to the vehicular microcomputer 15. When the light switch 28 is switched from on to off, the vehicular microcomputer 15 sends a light up signal to the LED 26 to light up the LED 26. The on state of the light switch 28 refers to any state other than off state. That is, the light switch 28 is turned on in two states, which are when a fog lamp is lighted up and when the headlight is lighted up. Therefore, when the light switch 28 is switched from on to off, and the fog lamp and the headlight are both off, the LED 26 is lighted up. When the engine switch 21 is manipulated to stop the engine 22, the vehicular microcomputer 15 sends a turn off signal to the LED 26.

In a lighting apparatus for the engine switch 21 that is constituted as described above, the vehicular microcomputer 15 determines that the light up conditions are satisfied and lights up the LED 26 when the light switch 28 is switched from on to off in a state in which the vehicular lighting device 128, such as the headlight, is turned on. When the LED 26 is lighted up, the light radiated from the LED 26 irradiates the engine switch 21 via the illumination window 27. When the user manipulates the engine switch 21, the vehicular microcomputer 15 stops the engine 22 and turns off the LED 26. Therefore, when the engine 22 is stopped, the engine switch 21 is no longer irradiated.

The first embodiment provides the following advantages.

When the vehicular lighting device 128, such as the headlight, is turned off, the vehicular microcomputer 15 lights on the LED 26 so that the engine switch 21 is irradiated. Therefore, the visibility of the engine switch 21 is increased, which permits the user to easily find the position of the engine switch 21. Accordingly, even if the passenger compartment is dark, such as at night, the position of the engine switch 21 is easily found before manipulating the engine switch 21 to stop the engine 22.

The vehicular microcomputer 15 detects whether the light switch 28 has been switched from on to off to determine whether the vehicular lighting device 128, such as the headlight, is turned off. Therefore, an additional member, such as a sensor, for detecting that the vehicular lighting device 128 is turned off is not required. This prevents the cost of the lighting apparatus for the engine switch 21 from increasing.

When the engine 22 is stopped by manipulating the engine switch 21, the LED 26 is turned off. Therefore, the user need not turn off the LED 26 manually after the engine 22 is stopped. Further, since an additional dedicated manual switch for lighting on and off the LED 26 is not required, the increase of the cost of the lighting apparatus for the engine switch 21 is further suppressed.

A second embodiment will now be described with reference to FIG. 4. The differences from the first embodiment will mainly be discussed below.

Figure 4:
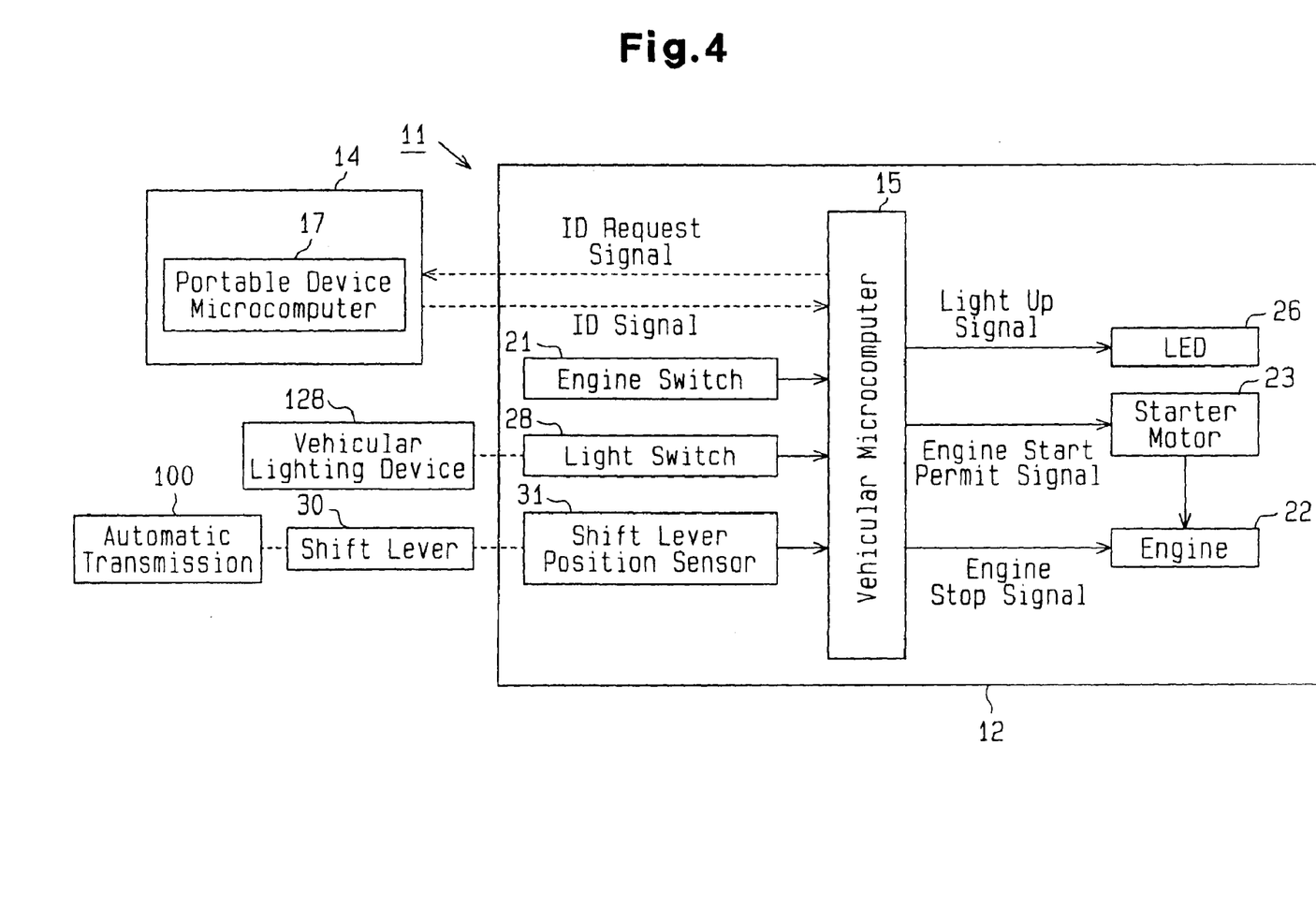
FIG. 4 is a block diagram illustrating a lighting apparatus for an engine switch according to a second embodiment of the present invention.

As shown in FIG. 4, a drive manipulation detecting device for detecting whether a drive manipulation member mounted to a vehicle is manipulated to a predetermined state, that is, a shift lever position sensor 31, is electrically connected to the vehicular microcomputer 15. The drive manipulation member, which is a shift lever 30 (see FIG. 2) in the second embodiment, is located in the passenger compartment. The shift lever position sensor 31 detects whether the shift lever 30 is located at a parking position (P range). If it is determined that the shift lever 30 is located at the parking position, the shift lever position sensor 31 sends a parking position detection signal to the vehicular microcomputer 15. The shift lever 30 can be switched to several positions including the parking position for controlling an automatic transmission 100 of the vehicle. If the light switch 28 is switched from on to off, and the vehicular microcomputer 15 receives the parking position detection signal, the vehicular microcomputer 15 determines that the light up conditions are satisfied and sends a light up signal to the LED 26.

The sequence of the timing at which the vehicular microcomputer 15 receives the parking position detection signal and the timing at which the light switch 28 is switched from on to off has no relationship to the lighting control of the LED 26. As long as the timing at which the vehicular microcomputer 15 receives the parking position detection signal and the timing at which the light switch 28 is switched are within a predetermined time period, the LED 26 is lighted up.

Therefore, in the lighting apparatus of the second embodiment, the LED 26 is not lighted up if only the light switch 28 is switched from on to off. The LED 26 is lighted up on condition that the shift lever 30 is located at the parking position. Therefore, the intention of the user to stop the engine 22 is more accurately detected. Accordingly, the timing for lighting up the LED 26 just before stopping the engine 22 is further optimized.

A third embodiment will now be described with reference to FIG. 5. The differences from the second embodiment will mainly be discussed below.

Figure 5:
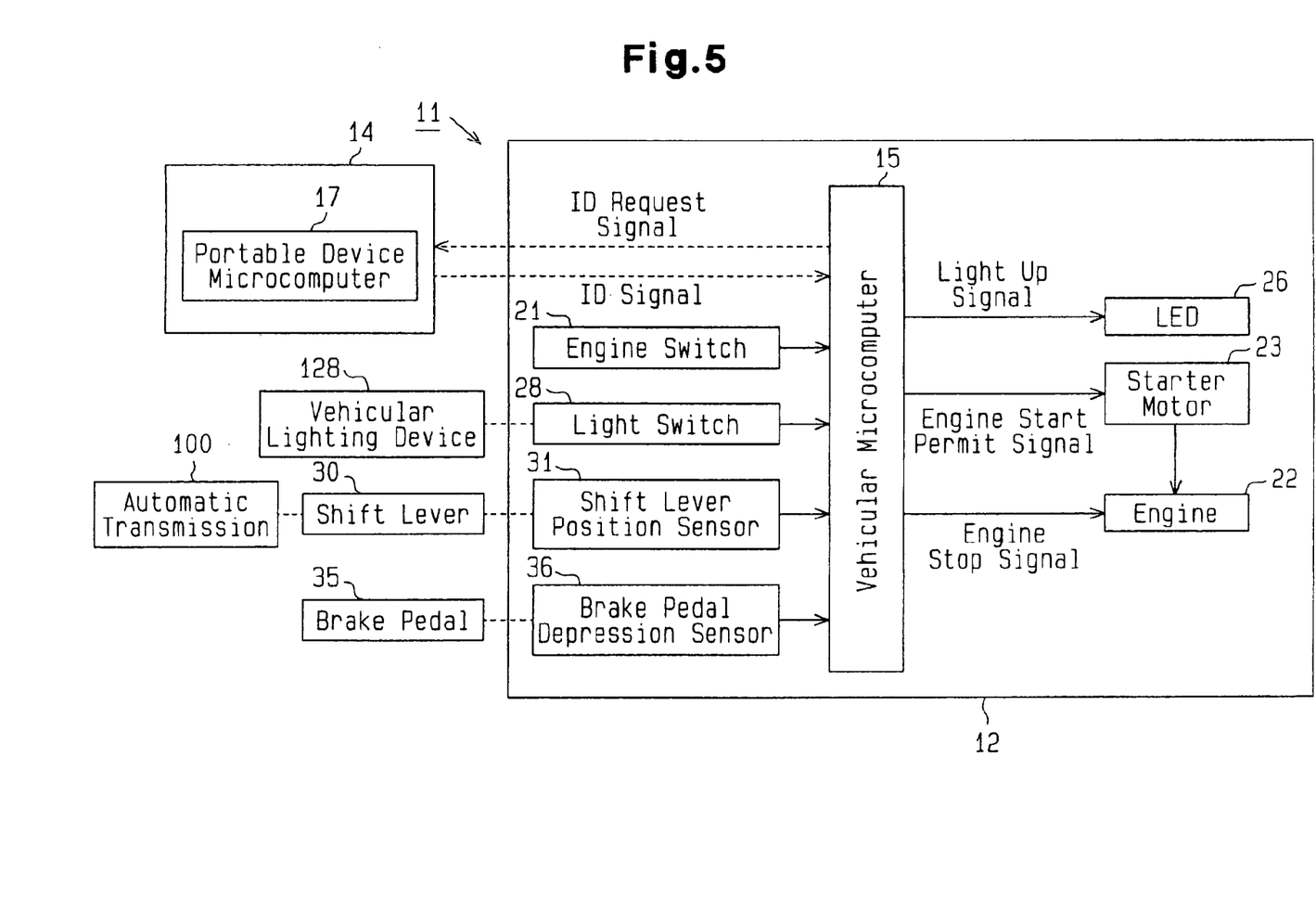
FIG. 5 is a block diagram illustrating a lighting apparatus for an engine switch according to a third embodiment.

As shown in FIG. 5, a brake pedal depression sensor 36 is electrically connected to the vehicular microcomputer 15. The brake pedal depression sensor 36 functions as a drive manipulation detecting device for detecting whether the drive manipulation member mounted to the vehicle is manipulated to a predetermined state as in the shift lever position sensor 31 described in the second embodiment. That is, the brake pedal depression sensor 36 detects whether the drive manipulation member, which is a brake pedal 35 (see FIG. 2) in the third embodiment, is manipulated. When the brake pedal 35 is manipulated (depressed), the brake pedal depression sensor 36 sends a brake depression detection signal to the vehicular microcomputer 15. The vehicular microcomputer 15 sends a light up signal to the LED 26 when light up conditions are satisfied, which includes that the light switch 28 is switched from on to off, the vehicular microcomputer 15 has received the parking position detection signal, and the vehicular microcomputer 15 has received the brake depression detection signal.

In the third embodiment, the LED 26 does not light up if only the light switch 28 for the vehicular lighting device 128 is switched from on to off, and the shift lever 30 is located at the parking position. In addition to these two conditions, the LED 26 is lighted up on condition that the brake pedal 35 is depressed. Thus, the intention of the user to stop the engine 22 is more accurately detected. Accordingly, the timing for lighting up the LED 26 is further optimized. The LED 26 may be lighted up only when, within a predetermined time, the light switch 28 is switched off, the shift lever 30 is shifted to the parking position, and the brake pedal 35 is depressed.

The control of the third embodiment may be changed as follows. The brake pedal 35 may be used as a light up manipulation member manipulated by a person to light up the LED 26. The vehicular microcomputer 15 may be used as means for validating or invalidating the light up manipulation of the LED 26 by the brake pedal 35 in accordance with the state of the light switch 28 and the shift lever 30. The vehicular microcomputer 15 determines that the predetermined validating conditions are satisfied and validates the light up manipulation of the LED 26 by the brake pedal 35 only when the light switch 28 is switched from on to off and the vehicular microcomputer 15 receives the parking position detection signal. In other words, the vehicular microcomputer 15 determines that predetermined permitting conditions are satisfied and permits the LED 26 to be lighted up based on the depression of the brake pedal 35 only when the light switch 28 is switched from on to off and the vehicular microcomputer 15 receives the parking position detection signal. When the light switch 28 is on, or the vehicular microcomputer 15 is not receiving the parking position detection signal, the vehicular microcomputer 15 does not send a light up signal to the vehicular microcomputer 15 even if the brake pedal 35 is depressed.

A dedicated LED light up switch is not provided for lighting up the LED 26. Instead, the brake pedal 35 serves as the LED light up switch. Therefore, it is not required to keep a space for placing the dedicated LED light up switch, and the number of parts is reduced, which suppresses increase of the cost. Further, since the brake pedal 35 serves as the LED light up switch, the operational performance is improved.

A fourth embodiment will now be described with reference to FIG. 6. The differences from the third embodiment will mainly be discussed below.

Figure 6:
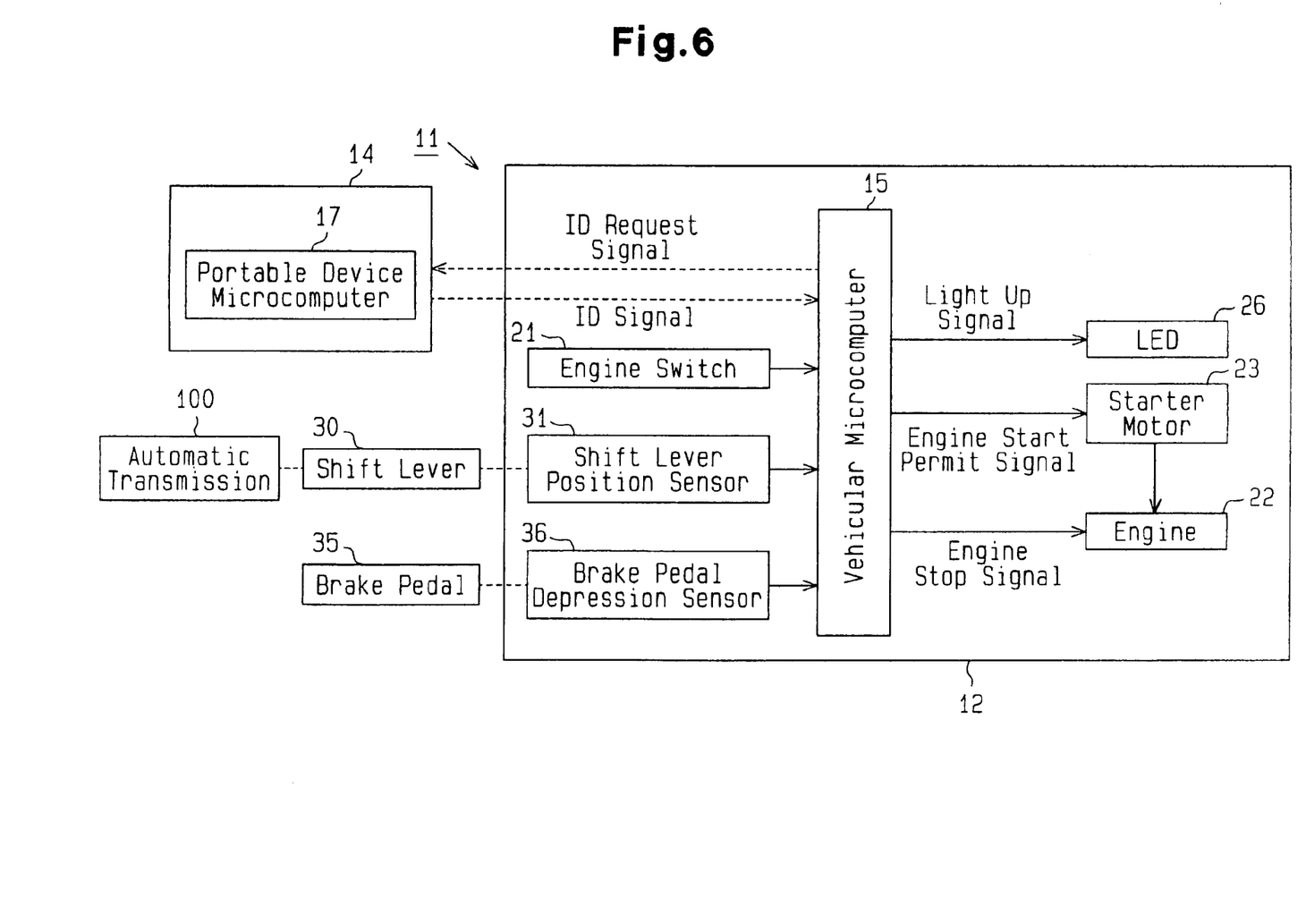
FIG. 6 is a block diagram illustrating a lighting apparatus for an engine switch according to a fourth embodiment.

As shown in FIG. 6, the vehicular microcomputer 15 does not detect manipulation of the light switch 28. Therefore, the vehicular microcomputer 15 sends a light up signal to the LED 26 on condition that the vehicular microcomputer 15 receives a parking position detection signal of the shift lever 30, and the brake pedal 35 is depressed. That is, the LED 26 is lighted up regardless of a condition whether the vehicular lighting device 128, such as the headlight, is turned off.

When the vehicular microcomputer 15 receives the parking position detection signal, the vehicular microcomputer 15 determines that the validating conditions (permitting conditions) are satisfied and validates the light up manipulation of the LED 26 by the brake pedal 35. As described above, in the fourth embodiment, the vehicular microcomputer 15 functions as means for validating or invalidating the light up manipulation of the LED 26 by the brake pedal 35 in accordance with the position of the shift lever 30.

Therefore, in the lighting apparatus of the fourth embodiment, the LED 26 is lighted up by depressing the brake pedal 35 on condition that the shift lever 30 is located at the parking position regardless of the state of the light switch 28. Therefore, as compared to the third embodiment, the circuit configuration for lighting up the LED 26 is simplified, and the cost is reduced.

A fifth embodiment will now be described with reference to FIG. 7. The differences from the second embodiment will mainly be discussed below.

Figure 7:
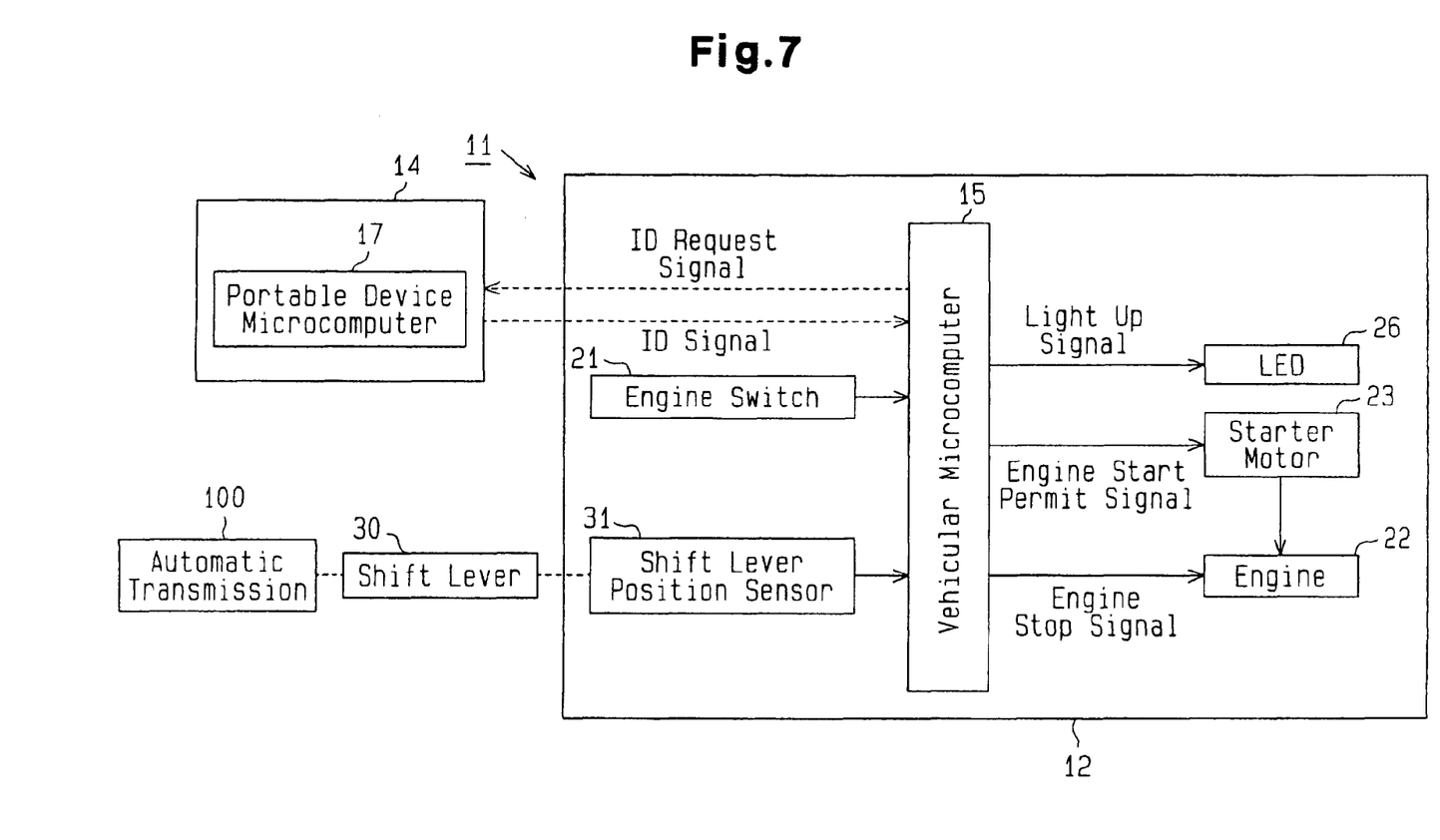
FIG. 7 is a block diagram illustrating a lighting apparatus for an engine switch according to a fifth embodiment.

As shown in FIG. 7, the vehicular microcomputer 15 does not detect the manipulation of the light switch 28 and performs light up control of the LED 26 based on only the signal from the shift lever position sensor 31. That is, upon receipt of the parking position detection signal from the shift lever position detection sensor 31, the vehicular microcomputer 15 determines that the light up condition is satisfied and sends a light up signal to the LED 26.

Therefore, in the sixth embodiment, the LED 26 is lighted up only on condition that the shift lever 30 is located at the parking position regardless of the lighting state of the vehicular light device 128, such as the headlight. At night, the passenger compartment is dim although instrument lights are lighted up. However, since the LED 26 is lighted up, the position of the engine switch 21 is easily found.

It should be apparent to those skilled in the art that the present invention may be embodied in many other specific forms without departing from the spirit or scope of the invention. Particularly, it should be understood that the invention may be embodied in the following forms.

The condition for lighting up the LED 26 may be any timing at which the lighting state of the vehicular lighting device 128 is switched. For example, the LED 26 may be lighted up when the vehicular lighting device 128 is switched from the headlight to the fog light.

In the above embodiments, the LED 26 is continuously lighted when the light switch 28 is switched from on to off, but the LED 26 may be designed to light up intermittently, that is, the LED 26 may be designed to flash. In this case, the position of the engine switch 21 is more easily found. Also, the LED 26 may be designed to light up and flash. That is, if the engine switch 21 is not manipulated to stop the engine 22 although a predetermined time has elapsed from when the LED 26 is lighted up, the vehicular microcomputer 15 may flash the LED 26.

The color of light of the LED 26 may be distinguishable from the color of the instrument lights. The position of the engine switch 21 is more easily found if the LED 26 radiates light the color of which is distinguishable from the color of the instrument light.

In the above embodiments, the illumination window 27 is located in the vicinity of the engine switch 21. Therefore, the light radiated from the LED 26 indirectly irradiates the engine switch 21. However, the engine switch 21 may be directly irradiated by the LED 26. For example, the engine switch 21 may be formed by light-transmitting material, and the LED 26 may be lighted up such that the engine switch 21 emits light. Alternatively, the engine switch 21 may be formed by light blocking material. The illumination window 27 that has a shape, such as picture or characters, at part of the engine switch 21 may be provided. With this structure, the engine switch 21 does not emit light, but only the illumination window 27 emits light.

In the third embodiment of FIG. 5 and the fourth embodiment of FIG. 6, the brake pedal 35 is used as the light up manipulation member for the LED 26. However, instead of or in addition to the brake pedal 35, at least one of an accelerator pedal, a direction indicator, a power window switch, and a seat belt may be used as the light up manipulation member. For example, when the seat belt is used as the light up manipulation member, a seat belt sensor for detecting manipulation of the seat belt is provided. When it is detected that the seat belt is undone by the seat belt sensor, the vehicular microcomputer 15 determines that a manipulation for lighting up the LED 26 is performed.

In the third embodiment of FIG. 5 and the fourth embodiment of FIG. 6, the LED 26 is lighted up when the brake pedal 35 is depressed once. However, instead of this, the LED 26 may be lighted up when the brake pedal 35 is consecutively depressed in a predetermined time (a relatively short time).

In the third embodiment of FIG. 5 and the fourth embodiment of FIG. 6, instead of the brake pedal 35, a dedicated LED light up switch may be provided as the light up manipulation member. The LED light up switch is, for example, located on the instrument panel 25 or in the vicinity of the power window switch, which is located on the side surface of the door of the automobile.

In the third embodiment of FIG. 5, the LED 26 may be lighted up when the brake pedal 35 is manipulated only on condition that the light switch 28 is switched from on to off.

The present examples and embodiments are to be considered as illustrative and not restrictive and the invention is not to be limited to the details given herein, but may be modified within the scope and equivalence of the appended claims.

What is claimed is:

1. A lighting apparatus for an engine switch that starts or stops an engine of a vehicle, the lighting apparatus comprising:

an engine switch light for irradiating the engine switch; and a controller for controlling the engine switch light, wherein, when a predetermined light up condition is satisfied, the controller lights up the engine switch light, and wherein the light up condition includes at least one of a condition that a lighting device other than the engine switch light located on the vehicle is switched to a predetermined state and a condition that a drive manipulation member, which is manipulated to drive the vehicle, is manipulated to a predetermined state.

2. The lighting apparatus according to claim 1, wherein, when the lighting device is switched from an on state to an off state, the controller determines that the light up condition is satisfied.

3. The lighting apparatus according to claim 2, wherein the vehicle includes a light switch, which is manipulated to light up or turn off the lighting device, and wherein, when the light switch is switched from on to off, the controller determines that the light up condition is satisfied.

4. The lighting apparatus according to claim 1, wherein the drive manipulation member includes at least one of a shift lever and a brake pedal, which are located on the vehicle.

5. The lighting apparatus according to claim 4, wherein, when the lighting device is switched from an on state to an off state and the shift lever is located at a parking position, the controller determines that the light up condition is satisfied.

6. The lighting apparatus according to claim 4, wherein, when the lighting device is switched from an on state to an off state and the brake pedal is depressed, the controller determines that the light up condition is satisfied.

7. The lighting apparatus according to claim 4, wherein, when the shift lever is located at a parking position, the controller determines that the light up condition is satisfied.

8. The lighting apparatus according to claim 4, wherein, when the shift lever is located at a parking position and the brake pedal is depressed, the controller determines that the light up condition is satisfied.

9. The lighting apparatus according to claim 1, wherein, when the engine is stopped in accordance with manipulation of the engine switch in a state in which the engine switch light is on, the controller turns off the engine switch light.

10. A smart ignition system that includes the lighting apparatus according to claim 1, wherein the smart ignition system includes a portable communication device, which is assigned with a unique ID code, and a vehicular apparatus, which is mounted to a vehicle and is assigned with a unique ID code, wherein the portable communication device sends an ID signal, which includes the ID code, to the vehicular apparatus, and wherein, when the ID code included in the received ID signal coincides with the ID code assigned to the vehicular apparatus, the vehicular apparatus permits starting of the engine in accordance with manipulation of the engine switch.

11. A lighting apparatus for an engine switch that starts or stops an engine of a vehicle, the lighting apparatus comprising:

an engine switch light for irradiating the engine switch;

a light up manipulation member, which is manipulated by a person to light up the engine switch light; and a controller for controlling the engine switch light, wherein, when a predetermined permitting condition is satisfied, the controller permits the engine switch light to be lighted up in accordance with manipulation of the light up manipulation member, and wherein the permitting condition includes at least one of a condition that a lighting device other than the engine switch light located on the vehicle is switched to a predetermined state and a condition that a drive manipulation member, which is manipulated to drive the vehicle, is manipulated to a predetermined state.

12. The lighting apparatus according to claim 11, wherein, when the lighting device is switched from an on state to an off state, the controller determines that the permitting condition is satisfied.

13. The lighting apparatus according to claim 12, wherein the vehicle includes a light switch, which is manipulated to light up or turn off the lighting device, and wherein, when the light switch is switched from on to off, the controller determines that the permitting condition is satisfied.

14. The lighting apparatus according to claim 11, wherein the drive manipulation member is a shift lever located on the vehicle.

15. The lighting apparatus according to claim 14, wherein, when the lighting device is switched from an on state to an off state and the shift lever is located at a parking position, the controller determines that the permitting condition is satisfied.

16. The lighting apparatus according to claim 14, wherein, when the shift lever is located at a parking position, the controller determines that the permitting condition is satisfied.

17. The lighting apparatus according to claim 11, wherein the drive manipulation member is a first drive manipulation member, and wherein the light up manipulation member serves also as a second drive manipulation member, which is manipulated to drive the vehicle and is different from the first drive manipulation member.

18. The lighting apparatus according to claim 17, wherein the second drive manipulation member is a brake pedal.

19. The lighting apparatus according to claim 18, wherein the first drive manipulation member is a shift lever.

20. The lighting apparatus according to claim 11, wherein, when the engine is stopped in accordance with manipulation of the engine switch in a state in which the engine switch light is on, the controller turns off the engine switch light.

21. A smart ignition system that includes the lighting apparatus according to claim 11, wherein the smart ignition system includes a portable communication device, which is assigned with a unique ID code, and a vehicular apparatus, which is mounted to a vehicle and is assigned with a unique ID code, wherein the portable communication device sends an ID signal, which includes the ID code, to the vehicular apparatus, and wherein, when the ID code included in the received ID signal coincides with the ID code assigned to the vehicular apparatus, the vehicular apparatus permits starting of the engine in accordance with manipulation of the engine switch.

* * * * *